US006627086B2

(12) United States Patent
Mahoney et al.

(10) Patent No.: US 6,627,086 B2
(45) Date of Patent: Sep. 30, 2003

(54) METHODS OF PRODUCING POLYARYLAMINES AND USING THEM FOR DETACKIFYING PAINT AND REMOVING COLOR FROM AQUEOUS SYSTEMS

(75) Inventors: Robert P. Mahoney, Newbury, MA (US); Christopher B. Murphy, Clarendon Hills, IL (US); Michael Dugan, Grand Rapids, MI (US)

(73) Assignee: Polymer Ventures, Inc., Charleston, SC (US)

( * ) Notice: Subject to any disclaimer, the term of this patent is extended or adjusted under 35 U.S.C. 154(b) by 81 days.

(21) Appl. No.: 09/813,747

(22) Filed: Mar. 21, 2001

(65) Prior Publication Data

US 2003/0006197 A1 Jan. 9, 2003

(51) Int. Cl.[7] .................................................. C02F 1/56
(52) U.S. Cl. ........................... 210/725; 95/152; 134/38; 162/189; 210/727; 210/728; 210/734; 210/735; 210/917; 210/928; 210/930; 423/122
(58) Field of Search ................................. 210/712, 725, 210/727, 728, 734, 735, 917, 930, 696, 697–701, 928; 95/152; 134/38; 162/189–191; 423/122, 121, 130

(56) References Cited

U.S. PATENT DOCUMENTS

| | | | | |
|---|---|---|---|---|
| 2,818,433 A | | 12/1957 | Erickson | 260/570 |
| 3,290,310 A | * | 12/1966 | Morf et al. | 544/207 |
| 3,300,406 A | * | 1/1967 | Pollio | 210/666 |
| 3,484,837 A | * | 12/1969 | Odom et al. | 210/728 |
| 3,861,887 A | | 1/1975 | Forney | 55/19 |
| 3,990,986 A | | 11/1976 | Gabel et al. | 252/315 |
| 4,002,490 A | | 1/1977 | Michalski et al. | 134/38 |
| 4,025,429 A | * | 5/1977 | Neuschutz | 210/728 |
| 4,130,674 A | | 12/1978 | Roberts et al. | 427/331 |
| 4,422,944 A | | 12/1983 | Selvarajan et al. | 210/736 |
| 4,425,238 A | * | 1/1984 | Degen et al. | 210/666 |
| 4,440,647 A | | 4/1984 | Puchalski | 210/712 |
| 4,629,572 A | | 12/1986 | Leitz et al. | 210/714 |
| 4,656,059 A | | 4/1987 | Mizuno et al. | 427/345 |
| 4,784,776 A | * | 11/1988 | Mangravite, Jr. | 210/728 |
| 4,798,909 A | * | 1/1989 | Biller | 564/334 |
| 4,853,132 A | | 8/1989 | Merrell et al. | 210/712 |
| 5,006,261 A | * | 4/1991 | Huang et al. | 210/712 |
| 5,155,200 A | * | 10/1992 | Limburg et al. | 528/67 |
| 5,240,509 A | | 8/1993 | Rey et al. | 134/38 |
| 5,359,141 A | * | 10/1994 | Knofel et al. | 564/331 |
| 5,961,838 A | * | 10/1999 | Braden et al. | 210/728 |

FOREIGN PATENT DOCUMENTS

JP       52071538       6/1977

* cited by examiner

Primary Examiner—Peter A. Hruskoci
(74) Attorney, Agent, or Firm—Nelson Mullins Riley & Scarborough

(57) ABSTRACT

Aqueous suspensions of paints in waste waters can be treated to detackify the paint and facilitate its removal by contacting the paint suspension at a pH of from about 5 to about 14 with a polyarylamine that is produced by reacting an aldehyde with an arylamine in the presence of an acid in an aqueous suspension. The same polyarylamine can also be used for reducing the color content of highly colored liquids. Compositions containing the polyarylamine are also described.

46 Claims, No Drawings

METHODS OF PRODUCING POLYARYLAMINES AND USING THEM FOR DETACKIFYING PAINT AND REMOVING COLOR FROM AQUEOUS SYSTEMS

BACKGROUND OF THE INVENTION (1) Field of the Invention

The present invention relates to the detackification of paints and the clarification of color-containing aqueous systems, and more particularly to the detackification of paints and the clarification of color-containing containing aqueous systems by the use of organic detackifiers.

(2) Description of the Related Art

The commercial application of primers and paints to articles such as vehicles, large appliances, large equipment, and other similar articles, is commonly carried out in paint spraying booths and with the use of automatic paint spraying apparatus. Large quantities of paints are applied at rapid rates and all paint that oversprays or drips from the target finally impacts some part of the paint booth or the painting apparatus, and must eventually be removed and disposed of.

Paint, as that term is used herein, includes a mixture of pigments and a fluid vehicle that provides a coating when applied to an appropriate surface. Paint encompasses a variety of water insoluble organic binder-containing coatings that are commonly applied by spraying operations. High solids, solvent-based base coats and clear coats are included, as are water-borne base and clear coats and solvent-borne and water-borne primers.

Typically, paint overspray is captured by a booth water wash stream which carries the paint to a sump where it is treated with a detackifier to convert it into a non-sticky sludge. The sludge can then be removed and disposed of and the water can be recycled to the spray booth.

Various methods have been reported for treating spray booth waters containing overspray paint, including the addition of compositions containing polymers and amphoteric metal salts which form insoluble hydroxides at pH levels above about 7.0. Such formulations are reported in, for example, U.S. Pat. Nos. 3,861,887, 3,990,986, 4,002,490, 4,130,674, and 4,440,647. U.S. Pat. No. 4,853,132 discloses the use of precipitates formed by the interaction of cationic polymers and inorganic anions to detackify solvent based paints.

U.S. Pat. No. 4,629,572 discloses the treatment of paint booth waste water with a blend of urea or aminotriazine-aldehyde polymers and water swellable clays. Another approach that was taught in U.S. Pat. No. 4,656,059 includes the use of melamine-formaldehyde polymers along with a surfactant (for paint dispersal) and a flocculant. JP 52071538 discloses the use of alum, polyaluminum chloride and calcium hydroxide in combination with polymer accelerators. U.S. Pat. No. 5,240,509 teaches the use of melamine-formaldehyde polymers in conjunction with an aluminum salt at pH values of 6.0 to 9.0.

U.S. Pat. No. 5,639,379 discloses the treatment of waste water effluent containing textile dyes with a permanganate salt, then hydrogen peroxide, followed by an inorganic coagulant (aluminum chlorohydrate) at basic pH and in the presence of an anionic organic coagulant. The clarification of low turbidity waters by the use of aniline-formaldehyde-polyamine polymers formed by a reaction having a formaldehyde:aniline ratio of at least 2, is disclosed in U.S. Pat. No. 4,422,944 to Selvarajan et al.

Mitchell, D. B., and G. A. Tonn, surveyed the use of inorganic and organic paint detackifiers in *Organic Paint Detackifiers and Associated Benefits*, presented at Water-Borne and Higher-Solids, and Powder Coatings Symposium, Feb. 26–28, 1992, New Orleans, La., sponsored by Dept. of Polymer Science, Univ. of Southern Miss., Hattiesburg, Miss., and Southern Society for Coatings Technology, pp. 610–625 (1992). Organic paint detackifiers that were discussed in that paper included mannich tannin, melamine formaldehyde resin, 1,3-phenylelediamine formaldehyde resin, 1,4-phenylelediamine formaldehyde resin, and aniline formaldehyde resin. The relative detackification performance of the last four of these materials was reported to be in the same order as they are listed above. Aniline formaldehyde resin was reported to provide poor detackification on all paint chemistries except two component polyurethanes, and its reduced efficacy compared to melamine formaldehyde resin was attributed to its limited insoluble surface area. No information was apparent regarding the composition of, or for the production or test conditions for any of the resins.

Despite the advances that have been made in the area of paint detackification and effluent water clarification, there remains a need for effective methods that can be used in different types of water treatment systems, such as for both paint detackification and clarification of effluent waters containing dyes, with a minimum amount of change or customization, and without the requirement of a number of additional components or of tedious and time-consuming monitoring and testing; there is also a need for such methods that require only relatively simple and inexpensive compounds; and there is also a need for methods of producing such compounds.

It is to these needs that the present invention is directed.

SUMMARY OF THE INVENTION

Briefly, therefore the present invention is directed to a novel method of clarifying an aqueous liquid comprising contacting the aqueous liquid with an effective amount of a polyarylamine polymer formed by the reaction of less than 2 moles of an aldehyde per mole of arylamine in the presence of an acid in an aqueous solution.

The present invention is also directed to a novel method for detackifying paint in an aqueous suspension comprising intermixing an effective amount of a polyarylamine polymer formed by the reaction of from about 0.5 to about 4 moles of an aldehyde per mole of an arylamine in the presence of an acid in an aqueous solution with the aqueous suspension comprising paint at a pH between about 5 and 14, thereby causing the paint to become detackified.

The present invention is also directed to a novel method for reducing the color content of a highly colored liquid comprising intermixing a highly colored liquid at a pH between about 0.1 and about 14 with an effective amount of a polyarylamine polymer formed by the reaction of from about 0.5 to about 4 moles of an aldehyde per mole of an arylamine in the presence of an acid in an aqueous solution.

The present invention is also directed to a novel composition for detackifying paint in an aqueous suspension comprising an aqueous mixture comprising a flocculant and/or a coagulant and a polyarylamine polymer formed by the reaction of less than 2 moles of an aldehyde per mole of arylamine in the presence of an acid in an aqueous solution.

The present invention is also directed to a novel composition for detackifying paint comprising an aqueous suspension of paint at a pH of greater than about 7, and an amount of a polyarylamine polymer that is sufficient to detackify the paint in the aqueous suspension and wherein the polyarylamine polymer is one that is formed by the reaction of less than 2 moles of an aldehyde per mole of arylamine in the presence of an acid in an aqueous solution.

The present invention is also directed to a novel method of producing a polyarylamine polymer that is suitable for detackifying paint and reducing the color content of highly colored liquids, the method comprising reacting less than 2 moles of aldehyde per mole of an arylamine in the presence of an acid to form a polyarylamine polymer.

The present invention is also directed to a novel method of reducing the color content of a highly colored liquid comprising contacting the liquid with an effective amount of a polyarylamine polymer formed by the reaction of from about 0.5 to about 4 moles of an aldehyde per mole of arylamine in the presence of an acid in an aqueous solution.

Among the several advantages found to be achieved by the present invention, therefore, may be noted the provision of an effective method that can be used in different types of water treatment systems, such as for both paint detackification and clarification of effluent waters containing dyes, with a minimum amount of change or customization; the provision of such methods that can be used without the requirement of a number of additional components or of tedious and time-consuming monitoring and testing; the provision of a method that requires only relatively simple and inexpensive compounds; the provision of compositions that contain can be used in such methods; and the provision of a method of producing such compounds.

DETAILED DESCRIPTION OF THE PREFERRED EMBODIMENTS

In accordance with the present invention, it has been discovered that a novel polyarylamine polymer can be used to detackify paint in aqueous paint suspensions by contacting the paint suspension with an effective amount of the novel polymer, preferably at a basic pH. The novel polyarylamine is formed by reacting an aldehyde, such as formaldehyde, with an arylamine, such as aniline, in the presence of an acid in an aqueous solution. It has surprisingly been found that a particularly effective form of the polyarylamine can be produced when the molar ratio of the aldehyde to the arylamine in the reaction to produce the polyarylamine is less than 2. (As used herein, the molar ratio of aldehyde to arylamine can be expressed as aldehyde:arylamine.) This was unexpected, because the molar composition of the reactants leading to the production of a polyarylamine polymer was not previously known to have an effect upon the efficacy of the polymer in detackifying paint.

When the novel polyarylamine is added to a paint-containing waste water in an amount of from about 0.2 to about 0.3 g/g of paint, for example, it provides detackification results that are at least as good as, and often superior to, those produced by a commercial melamine formaldehyde resin used at the same levels.

In an alternative embodiment, the same polyarylamine can be used, often at an acidic pH, to reduce the color content of highly colored waste waters.

The subject polyarylamine polymer is formed by polymerizing an aromatic amine (which can be referred to herein as an "arylamine") with an aldehyde. The arylamine of the present invention can be any aromatic amine that is capable of reaction with an aldehyde to form a polymer. Useful arylamines include molecules wherein an amine group is bonded directly to a cyclic compound. It is preferred, but not required, that the cyclic compound is a benzene or benzenoid ring.

Preferred arylamines include anilines, substituted anilines such as alkylanilines, phenylenediamines, aminophenols, methylenedianiline and its homologues, and mixtures thereof. Particularly useful arylamines include aniline, toluidine, aminophenol, aminosalicylic acid, anthranilic acid, and sulfanilic acid. A particularly preferred arylamine is aniline.

The aldehyde that is useful in the present invention is any aldehyde that is capable of reacting with an arylamine to form a polyarylamine polymer. In general, useful aldehydes include any compound having the formula $$R^1\text{—CHO}$$

where $R^1$ is hydrogen or is an alkyl, aryl, alkylaryl, arylalkyl, arylamino, alkylamino, carboxyl, or aldehyde group.

Particularly useful aldehydes for the present invention include, without limitation, formaldehyde, acetaldehyde, propionaldehyde, benzaldehyde, crotonaldehyde, butyraldehyde, glyceraldehyde, glyoxylic acid, glyoxal, glutaraldehyde, and mixtures thereof. A preferred aldehyde is formaldehyde.

Alternatively, the aldehyde can be provided by an aldehyde releasing agent, such as, for example trioxane, polyoxymethylenes, paraformaldehyde and hexamethylenetetramine.

It is preferred that the polymerization of the arylamine and the aldehyde of the present method is carried out in the presence of an acid. It is believed that the acid acts as a catalyst and promoter for the reaction. Acids that can be used for this purpose include mineral and organic acids. Particularly useful acids include hydrochloric acid, phosphoric acid, sulfuric acid, formic acid, acetic acid, glycolic acid, chloroacetic acid, citric acid. It is also possible to use mixtures of such acids. A particularly preferred acid is hydrochloric acid.

It is believed that the properties of the polyarylamine polymer can be modified by the inclusion of an amine that is in addition to, and is different than, the arylamine as a reactant in the polymerization reaction. However, the use of such materials is optional, and not required for the subject polyarylamine to be fully functional. In this specification, such an optional additional amine can be referred to as an "amine modifier". The amine modifier can be a primary amine, a secondary amine, an amide, an amidine, an imide, a polyamine, an aminoalcohol, an alkylenepolyamine, or a mixture of any of these. Preferred amine modifiers include methylamine, dimethylamine, benzylamine, ethylenediamine, phenylenediamines, aminophenols, diethylenetriamine, monoethanolamine, diethanolamine, fatty amines, dicyandiamide, melamine, urea and mixtures or combinations of any of these.

Particularly useful amine modifiers can include melamine, dicyandiamide, urea, diethylenetriamine, monoethanolamine and mixtures and combinations of these.

The arylamines, aldehydes, acids and amine modifiers of the present invention can be, but need not be, pure compounds and are most often materials having the standard purity and contaminant levels of such materials as are standard in the trade for commercial materials, or technical materials, of that name.

The condensation polymerization of an arylamine and an aldehyde is well known (See, e.g., U.S. Pat. No. 2,818,433, to Erickson et al., and Drumm et al., in *Step-Growth Polymerizations*, D. H. Solomon, Ed., pp. 262–263, Marcel-Dekker, Inc., New York (1972)). The general scheme of the reaction can be illustrated by the polymerization of aniline and formaldehyde, in the presence of an HCl catalyst, as shown by reactions I through IV, below:

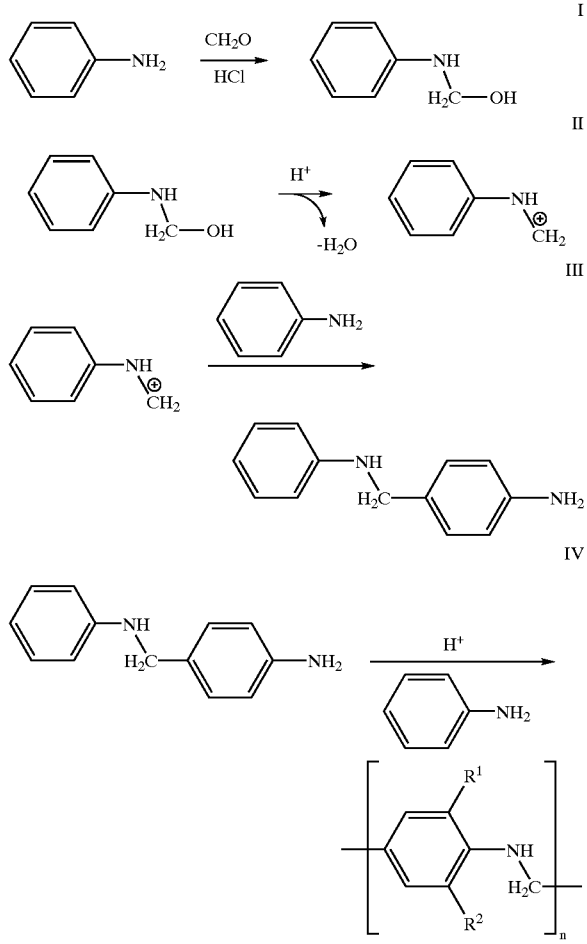

where $R^1$ and $R^2$ are independently hydrogen, or show a cross-linking or branching point in the polymer. It is believed that branching of the polymer can also occur from the nitrogen atoms.

The relative amounts of the arylamine and the aldehyde that are included as reactants in the polymerization reaction can range widely. However, because of the multiple potential reactions sites on an arylamine such as aniline, the aldehyde is rapidly consumed, and it is preferred that an amount of the aldehyde in excess of the stoichiometric amount required for straight chain polymerization be used in order to fully react all of the arylamine reactant. However, when the molar ratio of aldehyde-to-arylamine is increased, it is believed that polymer branching and cross-linking are promoted. If too much aldehyde is included, the resulting polymer will have excessive cross-linking. This can cause such undesirable characteristics as eventual gelation upon storage, even at ambient temperatures. It is also believed that the relative amounts of arylamine and aldehyde that are present for the polymerization reaction have an effect upon the molecular weight of the polymer and that this parameter also has an effect on the efficacy of the polymer in detackifying paints and clarifying highly colored waste waters.

The molar ratio of aldehyde:arylamine that is used for the reactants in the polymerization reaction of the subject method can vary widely, and can be almost any ratio that results in a polyarylamine product. However, it is preferred that the molar ratio of aldehyde:arylamine for the reactants in the polymerization reaction for the subject method is from about 0.5:1 to about 4:1, more preferably from about 0.5:1 to about 2:1, even more preferably to be less than 2:1, and yet more preferably to be from about 1.3:1 to about 1.7:1.

When an acid is included in the polymerization reaction as a catalyst, any amount of acid can be used that is sufficient to catalyze or accelerate the reaction. However, it is preferred that the ratio of the molar equivalents of acid to the moles of arylamine (which may be expressed herein as "acid:arylamine") in the polymerization reaction for the subject method is from about 0.2:1 to about 3:1, more preferably from about 0.5:1 to about 1.2:1, and even more preferably from about 0.7:1 to about 1:1.

If an optional amine modifier is included as a reactant in the polymerization reaction of the subject method, it can be included at any level. It is believed to be preferred, however, that an amine modifier, if one is present, be present in a molar ratio of amine modifier:arylamine of from about 0:1 to about 10:1, more preferably in a molar ratio of from about 0:1 to about 1:1, and more preferably in a molar ratio of from about 0:1 to about 0.6:1.

When an amine modifier is included in the polymerization reaction, the aldehyde and acid usage can be calculated as described above, except that the term describing the moles of arylamine is replaced by a term describing the sum of the total moles of arylamine+amine modifier. For example, if an aldehyde:arylamine molar ratio of 1.6:1 is desired, then such ratio would be fulfilled by a reaction mixture comprising 1.6 moles of aldehyde and any combination of arylamine and amine modifier that totaled 1.0 mole.

Without being bound by this or any other theory, the inventors believe that for paint detackification, a large surface area—thus, a small particle size—of the precipitated subject polyarylamine is needed for best performance. Therefore, it is believed that a certain molecular weight and level of cross-linking are preferred in order to maximize (1) the number of particles and (2) the surface area for a given mass of the polymer. The preferred molecular weight is sufficiently high to cause precipitation under the conditions of use, but not so high as to cause gelation of the polymer during manufacture and transport. Similarly, cross-linking is believed to promote insolubilization and particle formation, but excessive cross-linking is also believed to cause gelation of the polymer. In the subject method for producing polyarylamines, the molecular weight and cross-linking levels are interdependent, so that one cannot be changed without influencing the other.

Mechanistically, cationic polymers have been reported to be very effective in paint detackification. See, e.g. Mitchell, D. B. and Tonn, G. A., Id. To verify this hypothesis, the inventors have synthesized and tested amphoteric polymers of anthranilic acid-formaldehyde, sulfanilic acid-formaldehyde, and 4-aminosalicylic acid-formaldehyde as detackifiers with poor results. The failure of these polymers was attributed to relatively high polymer solubility at a pH of 8.5 (the test condition), and to having inadequate cationic charge. Similarly, purely anionic polymers of phenol-formaldehyde and salicylic acid-formaldehyde, being completely soluble under the test conditions, did not show any activity at all.

Attempts to modify the aniline-formaldehyde polymers of the present invention by the incorporation of a co-reactant such as urea did afford stable polymers with good activity, as long as the molar ratio of urea/aniline was <0.6.

Terpolymers of aniline-melamine-formaldehyde were also synthesized. However, it was found that because of limited water solubility of melamine, no more than 20 mole % melamine (based on aniline) could be incorporated into a stable terpolymer. No improvement in the detackification efficiency was noticed due to the presence of melamine in the polyarylamine polymer.

When aniline and formaldehyde are used as the arylamine and the aldehyde, other amines (the amine modifier) can be included in the polymer. The amine modifier can be a primary amine, such as methylamine or benzylamine, a secondary amine, such as dimethylamine, or N-methylaniline, a fatty amine, linear or branched alkyl or arylamines, guanidine, dicyandiamide, aminophenols, alkyl or aryl diamines such as ethylenediamine and phenylenediamines, or a polyamine such as diethylenetriamine. With such amines as these, at limited levels, polymerization could be realized by virtue of the amines being attached through the methylene bridges.

The polymerization of the arylamine and the aldehyde can be carried out by standard techniques. One suitable laboratory method involves charging a solution of water and the selected arylamine(s), such as aniline, into a glass polymerization flask equipped with a mechanical agitator, a condenser, an addition funnel, and a thermistor probe. Concentrated acid, such as hydrochloric acid, is added rapidly to the well-stirred aniline slurry and the clear solution of aniline hydrochloride is heated to 70° C.–85° C. After the mixture has reached this temperature, an aldehyde(s), such as formaldehyde, is added to the well-stirred mixture, whereupon a mild exotherm can be expected to raise the temperature of the mixture by 5° C. to 10° C. Heating is then resumed and the reaction temperature is maintained at about 100° C. for 2–6 hours. The product solution of the polyarylamine polymer of the present invention can then be cooled and collected.

The order of addition and reaction time and temperature can be changed without departing from the scope of the invention. The polyarylamine may be subjected to post treatment to reduce the concentration of residual reactants such as the arylamine, the aldehyde, or the acid starting materials. The post treatment can include heating, purging with a gas, reacting the residual starting materials with a detoxifying or inactivating agent, evaporation or distillation under atmospheric or reduced pressure, or a combination of these methods.

The polyarylamine polymer can be stored and used as is from the aqueous solution in which it is synthesized, or it can be concentrated, separated, purified, adsorbed, and/or dried to form a solid material. It is preferred that the polyarylamine is provided for transportation, storage, and/or sale in an aqueous solution at a pH that is sufficiently low to maintain the polymer in solution. When the polymer is to be used to detackify paint or to clarify highly colored waste waters, the solution can be added to the spray booth water, or to any other solution where its activity is desired, and the pH of that waste water, or other solution, can then be adjusted to the pH that is preferred for best results in the subject method.

The subject polyarylamine polymer is water soluble under acidic conditions and is increasingly non-water soluble as the pH is increased.

When it is said that the subject polyarylamine is water soluble under acidic conditions, what is meant is that the polyarylamine is soluble in water in an amount of at least about 0.05% by weight at 25° C. at a pH of 2. Preferably, it has a water solubility at 25° C. of at least about 0.1% by weight at a pH of 2, more preferably a solubility of at least about 1% by weight at a pH of 2, and even more preferably, a solubility of at least about 2% by weight at a pH of 2. When it is said that the subject polyarylamine is non-water soluble under basic conditions, it is meant that the polyarylamine has a solubility in water at 25° C. of less than about 0.05% at a pH of 12.

A preferred use for the subject polyarylamine is for paint detackification in painting operation waste waters. In this method, the polyarylamine is added to a waste water that contains, or is likely to be contacted with, or to contain, paint droplets or particles. The polyarylamine is added in an amount that is sufficient to cause the paint to become non-tacky, or non-sticky, to the extent necessary for the paint particles to be concentrated into a sludge that can be dewatered and handled. The paint sludge that has been treated with the subject polyarylamines can have a reduced tendency to stick to and foul surfaces with which it comes in contact, as compared with a paint sludge that has not been treated with the subject method. In standard paint-booth operations, it would be typical for the polyarylamine to be added to the paint-booth wash water as an emulsion or suspension and to be maintained in that water at some effective concentration. As the polyarylamine was attached to paint and removed from the wash water, additional polyarylamine could be added.

When the polyarylamine is used for paint detackification, it is believed to be advantageous that the polyarylamine not be present in the paint-booth wash water in the form of a true solution. Accordingly, it is common to maintain the spray booth wash water at a pH at which the polyarylamine is substantially non-water soluble. It is preferred that the waste water containing the paint is at a pH of from about 4 to about 14, when the polyarylamine is present. It is more preferred that the waste water be at a pH of from about 6 to about 12, and even more preferred that the waste water be at a pH of from about 7 to about 10, when the subject polyarylamine is present.

When the subject polyarylamine contacts the paint droplets, it causes the droplets to become less tacky and to become more easily dewatered. The dewatered paint sludge containing the subject polyarylamines is also more easily handled than a sludge in which the subject polyarylamines are not used. The paint sludge can be separated from the booth wash water, and the water can be recycled back to the booth.

The subject polyarylamines can also be used to treat solutions that contain solvents that are used for the cleaning of paint spray guns, paint lines, and other painting equipment. These cleaning solvents are known in the trade as "purge solvents". For such uses, the polyarylamine polymer preferably has the capability to cause the detackification of paint in the presence of purge solvents. After being used to clean painting equipment, the purge solvent contains some level of dispersed and/or dissolved paint, which can require detackification. Purge solvents generally contain a mixture of organic solvents. Alternatively, the purge solvent can be an aqueous emulsion of the organic solvents, optionally with surfactants and polymers. A common purge solvent mixture can include acetone, xylenes, ethylbenzene, trimethylbenzene, toluene, isopropanol and N-methylpyrrolidone.

The amount of the polyarylamine that is used for paint detackification can be from about 0.005 to about 10 grams of polyarylamine per gram of paint in the waste water. It is preferred that the polyarylamine is used in an amount of from about 0.03 to about 4 grams/gram of paint, more preferred in an amount of from 0.05 to 1 grams/gram of paint, and even more preferred in an amount of from 0.1–0.4 g of polyarylamine per gram of paint.

When the subject polyarylamine is added to a liquid for the purpose of paint detackification, it can be used alone, or it can be used to form a composition that also includes other detackifiers, flocculants, metal salts, metal hydroxides, coagulants, collectors, defoamers, surfactants, and the like. When another flocculant is used in such composition, such material can be an organic flocculant (cationic, anionic, nonionic, zwitterionic), such as polyvinylalcohol, styrene/ acrylate copolymers, acrylate/acrylamide copolymers, cationic acrylamide copolymers, dicyandiamide/formaldehyde polymers, melamine/formaldehyde polymers, urea/ formaldehyde polymers, epichlorohydrin/dimethylamine condensate, polyethylenimine, or poly (diallyldimethylammonium chloride). The polyarylamine can be used advantageously with inorganic metal oxides and salts such as alum, iron salts calcium carbonate, zirconium salts, aluminum hydroxide, titanium dioxide, silicates, silicas, and mixtures thereof. In particular, when the polyarylamine is present in such a composition in combination with an anionic or cationic flocculant, such materials as melamine/formaldehyde polymers, aluminum hydroxide, alum and mixtures and combinations of these can be used. The different additives can be added simultaneously or separately.

The subject polyarylamine has also been found to be particularly useful for coagulation and reducing the level of color-producing materials from non-paint containing liquids. The subject method can be used to reduce color in streams containing textile dyes, inks, colored effluents, papermill black liquors, lignins, lignosulfonates, humates, colloidal color bodies, and the like. It has also been found that the subject method is useful for reducing the color content of streams that occur as process streams or effluent streams from pulping processes, Bayer alumina processes and papermaking processes. Although the highly colored liquid can be aqueous, non-aqueous, or an aqueous/non-aqueous mixture, it is preferred that some water be present in the liquid. It is more preferred that the liquid be a predominantly aqueous liquid.

When it is said that the novel process may be used to "clarify" such highly colored streams as are described above, it is meant that the process reduces the color content of such streams. However, this does not necessarily mean that the streams are cleared of all color after the subject treatment. The clarified stream may be clear, but it may also simply have less color than before treatment.

In this embodiment, the polyarylamine is generally added to the highly colored liquid when the liquid is maintained at a pH of from about 0.1 to about 14. It is preferred that the pH be maintained at a value of from about 0.1 to about 7, more preferred at a value of from about 2 to about 5, and even more preferred at a value of from about 3 to about 5. The polyarylamine can be mixed with the colored waste water by any known method, and the coagulated color bodies can be removed from the liquid by any of several commonly known methods, such as, for example, centrifugation, filtration, settling, dissolved air flotation, and the like.

When the subject polyarylamine is added to the aqueous liquid, it can be used alone, or it can be used in conjunction with other, known, materials, such as cationic or anionic coagulants, organic or inorganic coagulants, metal salts, metal hydroxides, organic flocculants (cationic, anionic, nonionic, or zwitterionic), and combinations of such materials, to form a composition. In particular, it is believed that a composition that includes the subject polyarylamines can also advantageously include poly (diallyldimethylammonium chloride) (DADMAC), epichlorohydrin/dimethylamine polymer, dicyandiamide/ formaldehyde polymer, melamine/formaldehyde polymer, polyethyleneimine, alum, iron salts, and combinations of these. When the subject polyarylamine is used to form a composition that also includes one or more of these materials, the non-polyarylamine material can be added together with the polyarylamine, or the materials may be added separately.

The following examples describe preferred embodiments of the invention. Other embodiments within the scope of the claims herein will be apparent to one skilled in the art from consideration of the specification or practice of the invention as disclosed herein. It is intended that the specification, together with the examples, be considered to be exemplary only, with the scope and spirit of the invention being indicated by the claims which follow the examples.

General Procedures

In the examples all percentages are given on a weight basis unless otherwise indicated.

Aniline was provided in the form of a 99% pure liquid, and is available from Sigma-Aldrich, Milwaukee, Wis. It was used as received from the supplier.

Formaldehyde was provided in the form of a 37% solution in water, and is available from Sigma-Aldrich, Milwaukee, Wis. It was used as received from the supplier.

Concentrated hydrochloric acid was supplied as a 36.5%–38% solution of HCl in water and was used as supplied.

Examples 1–10 show the production of aniline-formaldehyde resins suitable for use in the method of the present invention.

EXAMPLE 1

A 1 liter resin flask was charged with 317 g. of deionized water and 37.2 g (0.4 moles) of aniline. To the well-stirred aqueous aniline slurry, concentrated HCl (0.36 moles, or molar equivalents) was rapidly added and the resultant aniline hydrochloride was heated externally to 85° C. A solution of formaldehyde (38.92 g of a 37% solution; 0.48 moles) was added dropwise in 3–5 minutes. There was a mild exotherm and the temperature rose to 90° C. The reaction temperature was raised to 100° C. and held for 2 hours. The resulting clear red solution was cooled, and the product solution containing 10% polymer solids, as poly (arylamine), and designated as Sample 1.

EXAMPLE 2

Example 1 was repeated except for (1) a rapid addition of formaldehyde to the aniline hydrochloride solution at 30° C., and (2) higher polymer concentration (30%). Yellow solids separated and posed stirring problems initially, however, the solids gradually dissolved as the reaction proceeded at 98°–100° C. The resulting dark red solution was cooled, collected and designated as Sample 2.

EXAMPLE 3

Example 1 was repeated, except with (1) a lower level of HCl (molar equivalents HCl/moles aniline=0.82), and (2) a polymer solids level of 40%. The product, a dark red solution designated as Sample 3, showed high residual aniline.

EXAMPLE 4

The procedure used in Example 1 was repeated with the following changes: a molar ratio of (1) formaldehyde/aniline=1.3, (2) molar equivalents acid to moles aniline (HCl/aniline)=0.9, and (3) polymer solids at 15%. The product, designated as Sample 4, was a clear dark red solution.

EXAMPLE 5

The procedure used in Example 1 was repeated with the following changes: a molar ratio of (1) formaldehyde/aniline=1.4, (2) HCl/aniline=0.94, and (3) polymer solids at 20%. The product, designated as Sample 5, was a clear red solution with good shelf stability.

EXAMPLE 6

The procedure used in Example 1 was repeated with the following changes: a molar ratio of (1) formaldehyde/aniline=1.6, (2) molar equivalents HCl/moles aniline=0.82, and (3) polymer solids at 10%. The product, designated as Sample 6, was a dark red solution.

EXAMPLE 7

Example 6 was repeated with a reduced level of HCl (molar equivalents of HCl/mole aniline=0.67). The product, designated as Sample 7, contained suspended insoluble particles.

EXAMPLE 8

The procedure used in Example 1 at 10% polymer solids was repeated with the following changes: a molar ratio of (1) formaldehyde/aniline=1.8, (2) molar equivalents HCl/moles aniline=0.74. The product, designated as Sample 8, contained suspended solids.

EXAMPLE 9

The procedure used in Example 1 at 10% polymer solids was repeated with the following changes: a molar ratio of (1) formaldehyde/aniline=1.5, (2) molar equivalents HCl/mole aniline=0.9. The clear red product, designated as Sample 9, contained residual aniline.

EXAMPLE 10

The procedure used in Example 9 was repeated with a lower level of HCL (molar equivalents of HCL/mole aniline=0.8), and the reaction time was extended to 6 hours. The clear solution, designated as Sample 10, contained very low residual aniline and had excellent shelf stability.

EXAMPLE 11

A preparation of methylenedianiline and higher homologues (39.6 g; 0.2 moles (assuming a molecular weight of 198); of Tonox 22, available from Uniroyal Chemical Co.) was melted and weighed into a 1 liter resin flask. Water (328 g) and 40 g HCl (molar equivalents of HCl/moles Tonox=2) were added to the methylenedianiline and the contents were heated with mild agitation. When the temperature reached 85° C., 24.4 g of formaldehyde solution (molar ratio formaldehyde/Tonox 22=1.5) was added in 5 minutes and polymerization was carried out at 98°–100° C. for 6 hours. The product, a dark red solution, was designated as Sample 11.

Examples 12–14 illustrate the production of polymers that include aniline and formaldehyde, as well as either urea or melamine, which polymers are suitable for use in the method of the present invention.

EXAMPLE 12

A 1 liter resin flask was charged with 446.8 g of water, 37.6 g (0.4 moles) of aniline, 9.6 g (0.16 moles) of urea, 42 g (0.455 moles) of HCl, 58.4 g (0.72 moles) of formaldehyde and the slurry was heated to 98°–100° C. The reaction was held at 98°–100° C. for 2 hours with stirring. The stable, clear red solution was collected at 10% solids and designated as Sample 12.

EXAMPLE 13

The procedure of Example 12 was repeated, except that the molar ratio of aniline:urea:formaldehyde:molar equivalents of HCl was changed to 1.0:0.6:2.0:1.0, and the polymer solids level was 20%. The product was a stable, clear red solution and was designated as Sample 13.

EXAMPLE 14

The procedure of Example 13 was repeated, except that urea was replaced with melamine. The molar ratios of aniline:melamine:formaldehyde:molar equivalents of HCl was 1.0:0.2:1.6:1.0, and the polymer solids level was 10%. The product was designated as Sample 14 and was clear and stable.

EXAMPLE 15

This example shows efficacy of the polymers that were produced in Examples 1–14 for paint detackification.

Paint detackification tests were performed for the polyarylamine sames produced in Examples 1–14 according to the following protocol:

Test Protocol for Detackification

Paint detackification tests are performed in a laboratory setting with authentic automotive paint samples.

1. Place 500 mL of process water and a 2 inch stir bar in a 1000 mL beaker, and begin mixing on a magnetic stir plate.
2. Add detackifier, without dilution, using a disposable syringe. A detackifier dose of 2 mL is typical.
3. Adjust the process water pH to 8.5 with 1–2 N sodium hydroxide, then turn the mixing speed to maximum and mix for 30 seconds.
4. Inject one mL of paint below the process water surface using a disposable syringe. Allow mixing to continue for 60 seconds.
5. (Optional) Add the flocculant and allow to mix for 60 seconds. A typical flocculant dose is 2 mL of a 0.1% solution.
6. Stop the mixer and observe the flocs formed. The size of flocs is rated on a 1–5 scale, with 1 being small flocs and 5 being large flocs. The uniformity of flocs is determined on a 1–5 scale, where 1 indicates heterogeneous flocs with areas of "live" or sticky paint, and 5 indicates a homogenous floc with complete paint inactivation. Water clarity is graded on a 1–5 scale, where 1 is visibly turbid with a high suspended solids content, and 5 is water-clear with no visible suspended solids.
7. The flocs are collected by filtration and the flocs are sheared to determine a detackification rating. To measure this, the filtered, flocculated paint is rubbed between wet filter papers or gloved fingers, and the amount of paint smearing is rated on a 1–5 scale. A detackification rating of 1 indicates extensive smearing of paint and adhesion to surfaces; a rating of 5 indicates no smearing or adhesion of "live" paint.

TABLE 1

Efficacy of different poly(arylamine) polymers for paint detackification.

| SAMPLE # | MOLAR RATIOS OF REACTANTS[a] | TIME OF REACTION (hrs. @ 100° C.) | SOLIDS CONTENT OF SOLUTION (% by wt.) | DETACKIFICATION RATING (1(worst)–5(best)) | FILTRATE CLARITY RATING (1(worst)–5(best)) |
|---|---|---|---|---|---|
| 1 | 1/1.2/—/—/0.9 | 2 | 10 | 3 | 4 |
| 2 | 1/1.2/—/—/0.82 | 2 | 30 | 3 | 4 |
| 3 | 1/1.2/—/—/0.82 | 2 | 40 | 3 | 4 |
| 4 | 1/1.3/—/—/0.9 | 2 | 15 | 5 | 5 |
| 5 | 1/1.4/—/—/0.94 | 2 | 20 | 5 | 5 |
| 6 | 1/1.6/—/—/0.82 | 2 | 10 | 5 | 5 |
| 7 | 1/1.6/—/—/0.67 | 2 | 10 | 5 | 5 |
| 8 | 1/1.8/—/—/0.74 | 2 | 10 | 5 | 5 |
| 9 | 1/1.5/—/—/0.8 | 2 | 10 | 5 | 5 |
| 10 | 1/1.5/—/—/0.8 | 6 | 10 | 5 | 5 |
| 11[c] | 1/1.5/—/—/2 | 6 | 10 | N/A | N/A |
| 12 | 1/1.8/0.4/—/1.8 | 2 | 10 | 4 | 5 |
| 13 | 1/2/0.6/1 | 2 | 20 | 5 | 5 |
| 14 | 1/1.6/—/0.2/1 | 2 | 10 | 5 | 5 |
| M/F[b] | — | — | 8.25 | 4 | 5 |

NOTES:
[a]A:F:U:M:HCl; where A = aniline, F = formaldehyde, U = urea, M = melamine, HCl = hydrochloric acid, and all numbers represent moles except for the numbers for acid, which represent molar equivalents. A dash (—) indicates the absence of a reactant.
[b]Melamine-formaldehyde resin at 8.25% actives was obtained from Cytec Industries, Inc., West Patterson, NJ.
[c]Tonox 22 was used as the source of aniline and higher homologues, and moles were calculated assuming a molecular weight of 198.

The results of Example 15 show that the polyarylamines made with 1.3–1.8 equivalents of formaldehyde per equivalent of arylamine provided superior performance as compared with melamine formaldehyde resin.

EXAMPLE 16

This example illustrates the use of the subject polyarylamine for paint detackification without the use of an additional flocculant.

The same procedure was used as was described above in Example 15, except that no optional flocculant was added in step #3.

TABLE 2

Efficacy of polyarylamine for paint detackification.

| Sample No./Name | Polymer Dose (g/g paint) | Test pH | Detackification rating (1-worst, to 5-best) | Clarity rating (1-worst, to 5-best) |
|---|---|---|---|---|
| 10 | 0.3 | 8.5 ± 0.2 | 5 | 4 |
| 10 | 0.2 | 8.5 ± 0.2 | 5 | 3 |
| 10 | 0.3 | 6.0 ± 0.2 | 5 | 1 |
| M/F | 0.3 | 8.5 ± 0.2 | 3 | 1 |
| M/F | 0.4 | 8.5 ± 0.2 | 3 | 1 |

These data show that the polyarylamine is more effective than melamine/formaldehyde resin as a detackifier without the assistance of an additional flocculant. In practical use terms, this will results in a lower dose requirement of the detackifier, the flocculant, or both, when using the polyarylamine rather than a melamine/formaldehyde resin.

EXAMPLE 17

This illustrates the use of the subject polyarylamine treating water containing solvents used for the purging of robotic paint spray guns and equipment.

The tests were carried out in the same fashion as the detackification tests of Example 15, but using purge solvent in addition to automotive paint. The clarity rating was replaced with a turbidity value, which is described below.

The purge solvent consisted of a blend of organic solvents (acetone, xylenes, ethylbenzene, and trimethylbenzene). The turbidity of the filtrate was measured using HACH DR/2010 portable spectrophotometer, where lower turbidity (NTU) is the desired result.

TABLE 3

Efficacy of subject polyarylamine in the presence of an organic solvent mixture.

| Sample # | Polymer dose (g) | Purge solvent dose (ml) | Detackification rating (1-worst, to 5-best) | Turbidity (NTU) |
|---|---|---|---|---|
| 10 | 0.05 | 0.75 | 5 | 24 |
| 10 | 0.075 | 0.75 | 5 | 8 |
| M/F | 0.062 | 0.75 | 4 | 100 |
| M/F | 0.124 | 0.75 | 4 | 51 |

The results of Example 17 show that the polyarylamine detackifies and clarifies water containing purge solvent more effectively than melamine/formaldehyde resin, and at a lower dose.

EXAMPLE 18

This example illustrates the use of the subject polyarylamine for the removal of colored dye from water.

Untreated solutions were prepared to contain 0.25% dye at pH 3.5–4.0 and the tests were carried out on a 400 ml sample in a 600 ml beaker. A dilute solution (0.05%) of polymer was added to a stirred dye solution to treat the dye, and stirring was continued for 90 seconds. The flocculated/ coagulated dye was allowed to settle, then the solution was filtered to remove the flocculated solids. The residual dye content of the filtrate was measured by measuring absorbance at 450 nm. Absorbance at 450 nm was interpreted as directly proportional to dye concentration, where untreated dye solution has an absorbance at 450 nm of >2.0. The untreated dye solution are highly colored solutions, where the treated solution (absorbance=0) is water clear.

TABLE 4

Efficacy of the subject polyarylamine for the clarification of highly colored water.

| Polymer dose (g actives) | Dye solution[a] | Absorbance at 450 nm |
| --- | --- | --- |
| 0 | Intralite Scarlet BNLL | >2 |
| 0.056 | | 0.82 |
| 0.075 | | 0.47 |
| 0.081 | | 0.09 |
| 0.094 | | 0 |
| 0 | Supralite Fast EFC | >2 |
| 0.25 | | 0.26 |
| 0.38 | | 0.07 |

Notes:
[a]Dyes are available from Crompton & Knowles.

The results from Example 18 show that the subject polyarylamines are effective for the removal of dyes from water.

All references cited in this specification, including without limitation all papers, publications, presentations, texts, reports, manuscripts, brochures, books, internet postings, journal articles, periodicals, and the like, are hereby incorporated by reference. The discussion of the references herein is intended merely to summarize the assertions made by their authors and no admission is made that any reference constitutes prior art. Applicants reserve the right to challenge the accuracy and pertinency of the cited references.

In view of the above, it will be seen that the several advantages of the invention are achieved and other advantageous results obtained.

As various changes could be made in the above methods and compositions without departing from the scope of the invention, it is intended that all matter contained in the above description shall be interpreted as illustrative and not in a limiting sense.

What is claimed is:

1. A method of clarifying an aqueous liquid which contains paint comprising: contacting the paint-containing aqueous liquid with an effective amount of a polyarylamine polymer formed by the reaction of about 0.5 moles to less than about 2 moles of an aldehyde per mole of arylamine in the presence of an acid in an aqueous solution to form a floc including said paint; and removing said floc from the aqueous liquid.

2. The method according to claim 1, wherein the contacting is carried out when the aqueous liquid has a pH value of from about 4 to about 14.

3. The method according to claim 2, wherein the aqueous liquid has a pH value of from about 6 to about 12.

4. The method according to claim 3, wherein the aqueous liquid has a pH value of from about 7 to about 10.

5. The method according to claim 2, wherein the aldehyde is a compound having the formula $$R^1—CHO$$

where $R^1$ is hydrogen or an alkyl, aryl, alkylaryl, arylalkyl, arylamino, alkylamino, carboxyl, or aldehyde group.

6. The method according to claim 5, wherein the aldehyde is selected from the group consisting of formaldehyde, acetaldehyde, propionaldehyde, benzaldehyde, crotonaldehyde, butyraldehyde, glyceraldehyde, glyoxalic acid, glyoxal, glutaraldehyde, and mixtures thereof.

7. The method according to claim 6, wherein the aldehyde is formaldehyde.

8. The method according to claim 2, wherein the aldehyde is provided by an aldehyde releasing agent selected from the group consisting of trioxane, polyoxymethylenes, paraformaldehyde, and hexamethylenetetramine.

9. The method according to claim 2, wherein, in addition to the polyarylamine, the aqueous liquid is contacted with a material that is selected from the group consisting of detackifiers, flocculants, metal salts, metal hydroxides, coagulants, dispersants, surfactants, collectors, defoamers, and mixtures thereof.

10. The method according to claim 9, wherein, in addition to the polyarylamine, the aqueous liquid is contacted with a flocculant that is selected from the group consisting of organic flocculants (cationic, anionic, nonionic, zwitterionic), polyvinylalcohol, styrene/acrylate copolymers, acrylate/acrylamide copolymers, cationic acrylamide copolymers, dicyandiamide/formaldehyde polymers, melamine/formaldehyde polymers, urea/formaldehyde polymers, and mixtures thereof.

11. The method according to claim 10, wherein the polyarylamine is present in combination with anionic or cationic flocculant, melamine/formaldehyde polymer, aluminum hydroxide, alum or combinations thereof.

12. The method according to claim 1, wherein the arylamine comprises an amine bonded directly to a cyclic compound.

13. The method according to claim 12, wherein the arylamine comprises a member selected from the group consisting of aniline, alkylanilines, phenylenediamines, aminophenols, methylenedianiline and its homologues, and mixtures thereof.

14. The method according to claim 12, wherein the cyclic compound comprises a benzene or benzenoid ring.

15. The method according to claim 12, wherein the arylamine is selected from the group consisting of aniline, toluidine, aminophenol, aminosalicylic acid, anthranilic acid, sulfanilic acid.

16. The method according to claim 15, wherein the arylamine comprises aniline.

17. The method according to claim 12, wherein the aqueous solution in which the polyarylamine polymer is formed comprises an amine modifier selected from the group consisting of primary amines, secondary amines, amides, imides, imidines, polyamines, alkylenepolyamines, aminoalcohols and mixtures thereof.

18. The method according to claim 17, wherein the amine modifier is selected from the group consisting of methylamine, dimethylamine, benzylamine, ethylenediamine, phenylenediamines, aminophenols, diethylenetriamine, monoethanolamine, diethanolamine, fatty amines, dicyandiamide, melamine, urea and combinations thereof.

19. The method according to claim 17, wherein the amine modifier is selected from the group consisting of melamine, dicyandiamide, urea, diethylenetriamine, monoethanolamine and mixtures thereof.

20. The method according to claim 19, wherein the amine modifier comprises urea and the urea is present in an amount that is less than about 0.6 moles per mole of the arylamine.

21. The method according to claim 19, wherein the amine modifier is melamine and the melamine is present in an amount that is less than about 20% by weight of the amount of the arylamine.

22. The method according to claim 17, wherein the molar ratio of amine modifier:arylamine is from 0:1 to 10:1.

23. The method according to claim 22, wherein the molar ratio of amine modifier:arylamine is from 0:1 to 1:1.

24. The method according to claim 23, wherein the molar ratio of amine modifier:arylamine is from 0:1 to 0.6:1.

25. The method according to claim 1, wherein the acid is selected from the group consisting of hydrochloric acid, phosphoric acid, sulfuric acid, formic acid, acetic acid, glycolic acid, chloroacetic acid, citric acid and mixtures thereof.

26. The method according to claim 25, wherein the acid is hydrochloric acid.

27. The method according to claim 1, wherein the molar ratio of aldehyde:arylamine is from 1.3:1 to 1.7:1.

28. The method according to claim 27, wherein the ratio of molar equivalents of acid:moles arylamine in the reaction to form the polyarylamine polymer is from 0.2:1 to 3:1.

29. The method according to claim 27, wherein the ratio of molar equivalents acid:moles arylamine in the reaction to form the polyarylamine polymer is from 0.5:1 to 1.2:1.

30. The method according to claim 29, wherein the ratio of molar equivalents acid:moles arylamine in the reaction to form the polyarylamine polymer is from 0.7:1 to 1:1.

31. The method according to claim 1, wherein the aqueous liquid further comprises a colored material that is different than paint and the contacting is carried out when the aqueous liquid has a pH value of from about 0.1 to about 14.

32. The method according to claim 1, wherein the aqueous liquid comprises a purge solvent.

33. A method for detackifying paint in an aqueous suspension comprising intermixing an effective amount of a polyarylamine polymer formed by the reaction of from about 0.5 to less than about 2 moles of an aldehyde per mole of an arylamine in the presence of an acid in an aqueous solution with the aqueous suspension comprising paint at a pH between about 5 and 14, thereby causing the paint to become detackified; and removing detackified paint from the aqueous suspension.

34. A method for reducing the color content of a colored liquid comprising intermixing a colored liquid at a pH between about 0.1 and about 14 with an effective amount of a polyarylamine polymer formed by the reaction of from about 0.5 to less than about 2 moles of an aldehyde per mole of an arylamine in the presence of an acid in an aqueous solution to form a floc containing said color content, and removing said floc from the liquid.

35. The method according to claim 34, wherein the colored liquid is an aqueous liquid.

36. The method according to claim 34, wherein the colored liquid contains humate, lignin, or lignosulfonate.

37. The method according to claim 34, wherein the colored liquid is a process stream or effluent from a pulping process, a Bayer alumina process, or a papermaking process.

38. The method according to claim 34, wherein the polyarylamine is added to the colored liquid at a pH above about 7.

39. The method according to claim 34, wherein the polyarylamine is added to the colored liquid at a pH between about 0.1 and 7.

40. The method according to claim 34, wherein the intermixing is carried out at a pH between 2 and 6.

41. The method according to claim 40, wherein the intermixing is carried out at a pH between 3 and 5.

42. The method according to claim 34, wherein the colored liquid is intermixed with a detackifier, flocculant, metal salt, metal hydroxide, coagulant, collector, or defoamer, in addition to the polyarylamine polymer.

43. The method according to claim 42, wherein the liquid is intermixed with a flocculant that comprises a material selected from the group consisting of organic flocculants (cationic, anionic, nonionic, zwitterionic), poly(diallyldimethylammonium chloride), epichlorohydrin/dimethylamine polymers, polyethyleneimine, alum, iron salts, dicyandiamide/formaldehyde polymer, melamine/formaldehyde polymer, urea/formaldehyde polymer, and mixtures thereof.

44. The method according to claim 43, wherein the polyarylamine is present in combination with an anionic or cationic flocculant, a melamine/formaldehyde polymer, aluminum hydroxide, alum or combinations thereof.

45. The method according to claim 34, wherein the polyarylamine is present at 1–100 ppm.

46. A method of clarifying an aqueous liquid containing textile dyes, inks, colored effluents, papermill black liquors, lignins, lignosulfonates, humates, or colloidal color bodies, comprising contacting the aqueous liquid with an effective amount of a polyarylamine polymer formed by the reaction of from about 0.5 to less than about 2 moles of an aldehyde per mole of arylamine in the presence of an acid in an aqueous solution to form a floc including the textile dye, ink, colored effluent, papermill black liquor, lignin, lignosulfonate, humate, or colloidal color body, and removing the floc.

* * * * *